United States Patent
Kitamura et al.

(10) Patent No.: US 10,593,490 B2
(45) Date of Patent: Mar. 17, 2020

(54) SWITCHING DEVICE HAVING A PUSH BUTTON

(71) Applicant: LENOVO (SINGAPORE) PTE LTD., Singapore (SG)

(72) Inventors: Masahiro Kitamura, Kanagawa (JP); Mitsuo Horiuchi, Kanagawa (JP); Satoshi Douzono, Kanagawa (JP)

(73) Assignee: LENOVO (SINGAPORE) PTE LTD, Singapore (SG)

( * ) Notice: Subject to any disclaimer, the term of this patent is extended or adjusted under 35 U.S.C. 154(b) by 114 days.

(21) Appl. No.: 15/724,397

(22) Filed: Oct. 4, 2017

(65) Prior Publication Data

US 2018/0096804 A1 Apr. 5, 2018

(30) Foreign Application Priority Data

Oct. 5, 2016 (JP) ................................. 2016-196987

(51) Int. Cl.
| | | |
|---|---|---|
| *H01H 13/70* | (2006.01) | |
| *G06F 1/16* | (2006.01) | |
| *H01H 13/705* | (2006.01) | |
| *G06F 3/02* | (2006.01) | |

(52) U.S. Cl.
CPC ............ *H01H 13/70* (2013.01); *G06F 1/169* (2013.01); *G06F 1/1684* (2013.01); *G06F 3/0213* (2013.01); *H01H 13/705* (2013.01); *G06F 1/1616* (2013.01); *H01H 2221/016* (2013.01); *H01H 2221/044* (2013.01); *H01H 2227/026* (2013.01)

(58) Field of Classification Search
None
See application file for complete search history.

(56) References Cited

U.S. PATENT DOCUMENTS

2012/0250251 A1* 10/2012 Liang ................. G06F 1/1684
361/679.55
2014/0015754 A1* 1/2014 Chang ................. G06F 3/0362
345/168

FOREIGN PATENT DOCUMENTS

| CN | 202018902 | 10/2011 |
|---|---|---|
| CN | 202434376 | 9/2012 |
| CN | 105023788 | 11/2015 |
| JP | S60163642 | 10/1985 |
| JP | H0679042 | 11/1994 |
| JP | 2003242860 | 8/2003 |

(Continued)

*Primary Examiner* — Amare Mengistu
*Assistant Examiner* — Sarvesh J Nadkarni
(74) *Attorney, Agent, or Firm* — Anthony P. Ng; Russell Ng PLLC

(57) ABSTRACT

A switching device capable of receiving pressing operations for an electronic device is provided. The switching device includes a push button rotatably supported on an upper surface of a base member, and a detection switch that is pressed when the push button is pressed to rotate. Either the push button or the base member includes an engaging part and an elastic part, while the other one of the push button or the base member includes a rotational shaft with which the engaging part is rotatably engaged and a supporting shaft against which the elastic part is pressed. The push button rotates about an engaged portion between the engaging part and the rotational shaft with the elastic part being pressed against the supporting shaft, and presses the detection switch.

16 Claims, 9 Drawing Sheets

(56) References Cited

FOREIGN PATENT DOCUMENTS

| JP | 5947962 | 7/2016 |
|----|---------|--------|
| JP | 2016-43392 A | 8/2016 |

* cited by examiner

SWITCHING DEVICE HAVING A PUSH BUTTON

PRIORITY CLAIM

The present application claims benefit of priority under 35 U.S.C. §§ 120, 365 to the previously filed Japanese Patent Application No. JP2016-196987 with a priority date of Oct. 5, 2016, which is incorporated by reference herein.

TECHNICAL FIELD

The present invention relates to electronic devices in general, and in particular to an electronic device having, a switching device with a push button for receiving a pressing operation.

BACKGROUND

Some electronic devices, such as a notebook personal computer (laptop PC), are provided with a push button for receiving a pressing operation. A push button can be pressed by rotatably supporting the push button on a base member at the lower surface of the push button. In a portion of the push button serving as a hinge of the rotation structure, backlash of the push button cannot be completely eliminated because of dimensional tolerance among members coupled to one another. Thus, backlash of the push button occurs irrespective of operation or non-operation, which causes degradation of product quality.

On the other hand, to minimize the dimensional tolerance among members in order to reduce the backlash, higher skills of manufacturing technicians are required. As a result, product quality might vary, depending on the skill levels of the manufacturing technicians.

Consequently, it would be preferable to provide an improved switching device having a push button with enhanced product quality and manufacturing efficiency.

SUMMARY

In accordance with an embodiment of the present disclosure, a switching device includes a base member, a push button and a detection switch. The push button is rotatably supported on an upper surface of the base member. One of the push button or the base member includes an engaging part and an elastic part, while another one of the push button or the base member includes a rotational shaft with which the engaging part is rotatably engaged, and a supporting shaft against which the elastic part is pressed. The detection switch is pressed in response to the push button being pressed to rotate. The push button rotates about an engaged portion between the engaging part and the rotational shaft with the elastic part being pressed against the supporting shaft, and in turn, presses the detection switch.

With the above-mentioned configuration, since the elastic part is pressed against the supporting shaft, backlash between the engaging part constituting the rotational shaft the push button and the rotational shaft can be absorbed. As a result, the switching device can prevent occurrence of backlash of the push button in the front-and-rear, lateral, or vertical direction irrespective of whether the push button is in use or not. In addition, the switching device can provide a margin in dimensional tolerance regarding the engaged portion between the engaging part and the rotational shaft. Thus, the switching device does not require special skills in manufacturing, and the push button can be easily assembled to the base member so that manufacturing efficiency can be achieved.

All features and advantages of the present disclosure will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

Figure 1:
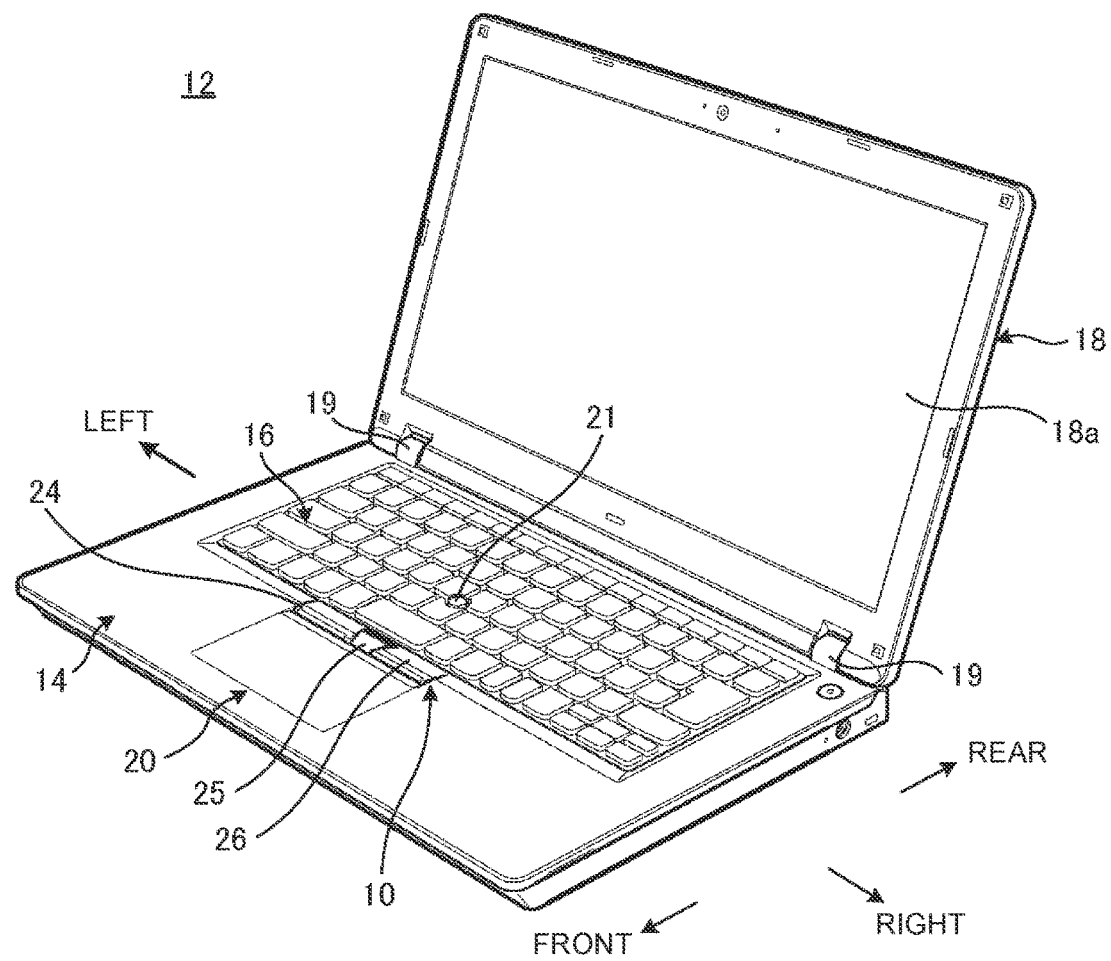
FIG. 1 is a perspective view of an electronic device having a switching device, according to an embodiment of the present invention.

FIG. 1 is a perspective view of an electronic device 12 including a switching device 10 according to an embodiment of the present invention. The following description is based on a state of use where the switching device 10 is mounted on the electronic device 12 illustrated in FIG. 1, and the side toward a user, the side away from the user, the thickness direction, and the width direction will be hereinafter referred to as the front (forward), the rear (rearward), the vertical direction, and the lateral direction, respectively.

As shown in FIG. 1, the electronic device 12 is a laptop PC with a main body chassis 14 including the switching device 10 and a keyboard device 16, and a display chassis 18 including a display device 18a such as a liquid crystal display. The display chassis 18 is coupled to the main body chassis 14 with a pair of left and right hinges 19 and 19 so that the display chassis 18 can be opened and closed.

The main body chassis 14 houses various electronic components such as an unillustrated board, an arithmetic processing unit, a hard disk device, and a memory. The switching device 10 and the keyboard device 16 are disposed in the front-and-rear direction on the upper surface of the main body chassis 14. A touch pad device 20 is disposed forward of the switching device 10. A pointing stick 21 is disposed substantially at the center of the keyboard device 16.

The touch pad device 20 and the pointing stick 21 are input units that are used for operating a cursor (or mouse pointer) displayed on the display device 18a and can be operated instead of a mouse. The touch pad device 20 is configured as a click pad that can be used for a touch operation by an approach or a contact of a finger or the like and a pressing (or click) operation.

Figure 2:
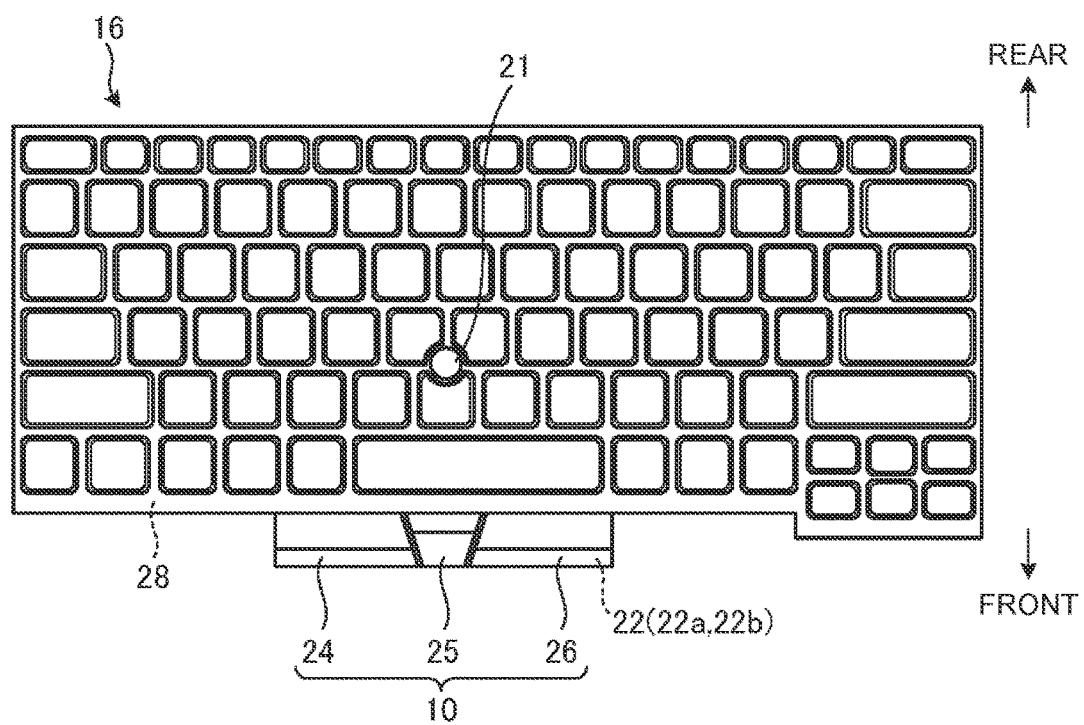
FIG. 2 is a top view of the switching device and a keyboard device.
Figure 3:
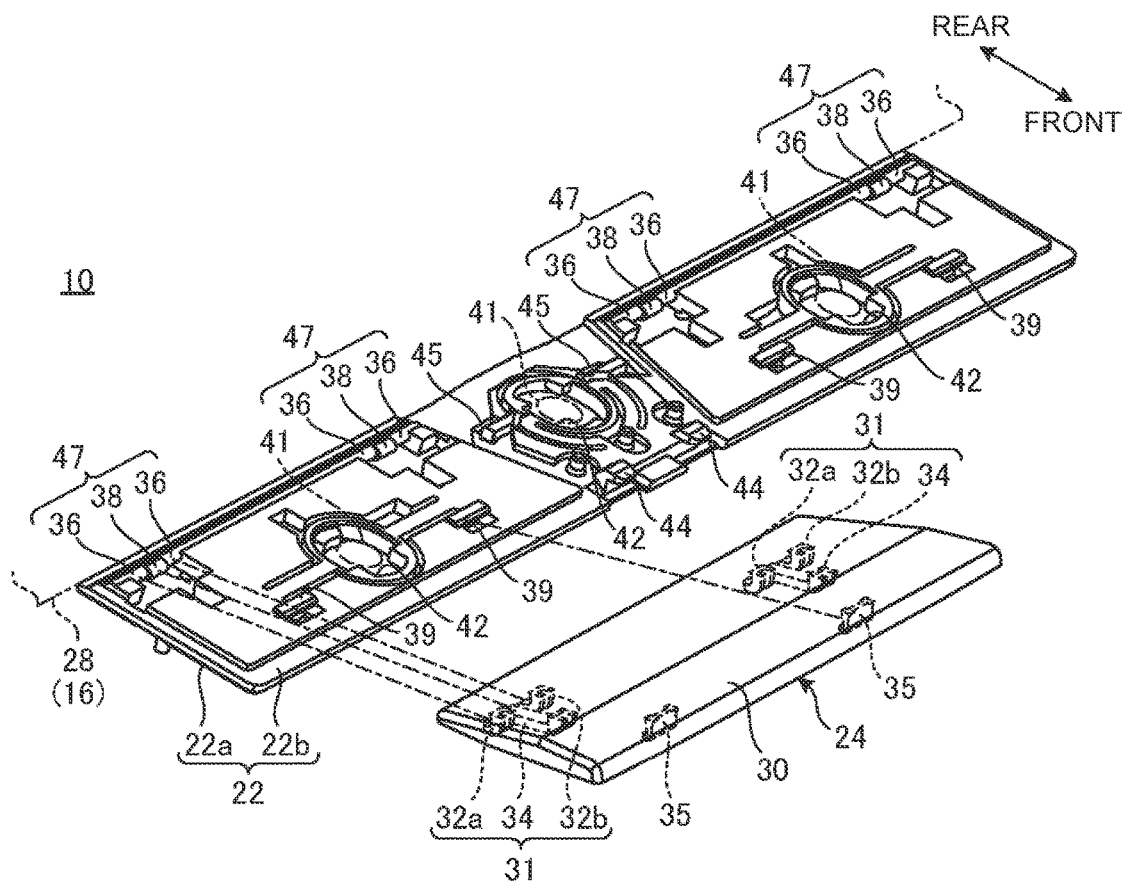
FIG. 3 is a perspective view of the disassembled switching device.

FIG. 2 is a top view of the switching device 10 and the keyboard device 16. FIG. 3 is a disassembled perspective view of the switching device 10.

As illustrated in FIGS. 2-3, the switching device 10 according to the present embodiment is integrally provided with the keyboard device 16, and projects from substantially the center of the front peripheral portion. The switching device 10 includes three push buttons 24, 25, and 26 rotatably supported on the upper surface of the base member 22.

The base member 22 is a plate member serving as a bottom plate of the switching device 10. The base member 22 includes a base plate 22a made of a metal thin plate and a housing plate 22b made of a resin thin plate and fixed to the upper surface of the base plate 22a. In this embodiment, the base plate 22a is integrated with the base plate 28 of the keyboard device 16. That is, part of the single base plate is used as the base plate 28 of the keyboard device 16, and the other part of the base plate is used as the base plate 22a of the switching device 10. The base plate 22a of the switching device 10 may be configured as a member separately from the base plate 28 of the keyboard device 16.

The push buttons 24 through 26 function in conjunction with a cursor operation with the touch pad device 20 or the pointing stick 21. The push buttons 24 through 26 are click operation buttons corresponding to the left button, the center button, and the right button, respectively, of a typical mouse. That is, the switching device 10 is an input unit for operating a cursor displayed on the display device 18a.

Figure 4A:
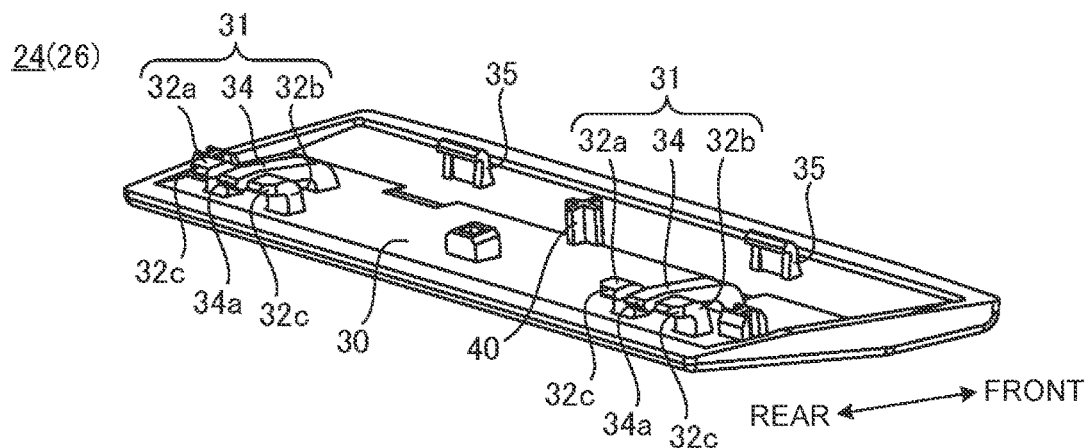
FIG. 4A is a perspective view of a left push button when viewed from below.
Figure 4B:
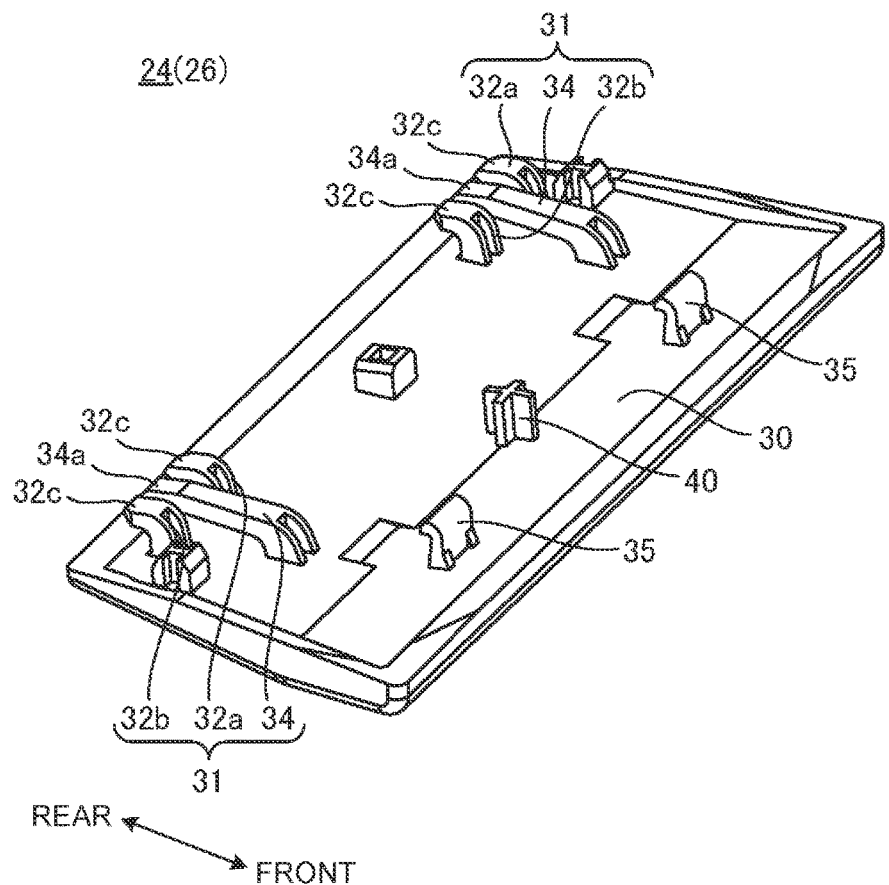
FIG. 4B is a perspective view of the push button illustrated in FIG. 4A hen viewed from a different angle.

FIG. 4A is a perspective view of a left push button 24 when viewed from below. FIG. 4B is a perspective view of the push button 24 when viewed from a different angle.

As illustrated in FIGS. 3 through 4B, the left push button 24 includes an operation plate member 30 that receives a pressing operation and two pairs of left and right engaging shaft members 31 disposed on the lower surface of the operation plate member 30. Each of the engaging shaft members 31 includes a pair of left and right engaging parts 32a and 32b and an elastic part 34. The lower surface of the operation plate member 30 is further provided with a pair of left and right stopper members 35. The engaging parts 32a and 32b and the elastic part 34 constituting each engaging shaft member 31 are arranged side by side at the left or right on a rear end portion of the lower surface of the operation plate member 30. One or three or more pairs of engaging shaft members 31 may be provided on the lower surface of the operation plate member 30.

The operation plate member 30 is a resin plate member having a substantially rectangular shape in plan view. The upper surface of the operation plate member 30 serves as an operating surface of the push button 24. The operation plate member 30 can be pressed by an operation of the touch pad device 20 and/or the pointing stick 21.

Figure 5:
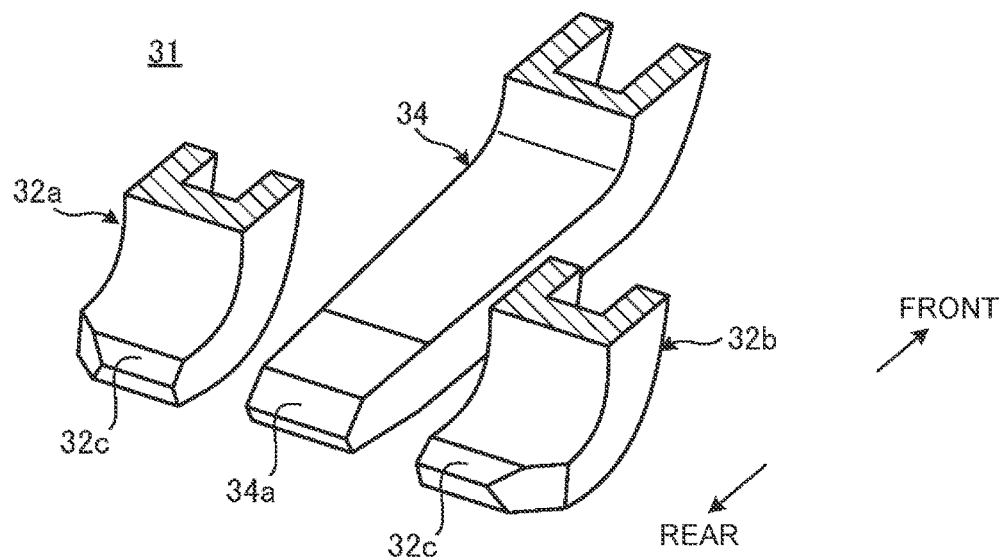
FIG. 5 is an enlarged view of an engaging shaft member of the push button.

FIG. 5 is an enlarged view of the engaging shaft member 31 of the push button 24 in a state where the engaging parts 32a and 32b and the elastic part 34 are separated from the operation plate member 30 at their proximal ends. The two pairs of the engaging shaft members 31 of the push button 24 are symmetric at the left and right and have substantially the same configuration.

As illustrated in FIGS. 3 through 5, the pair of engaging parts 32a and 32b is disposed in the lateral direction on the lower surface of the operation plate member 30. Each of the engaging parts 32a and 32b is a hook member hanging down from the lower surface of the operation plate member 30 and then projecting rearward along the lower surface of the operation plate member 30. Each of the engaging parts 32a and 32b is rotatably engaged with a rotational shaft 36 (see FIG. 3) disposed on the base member 22 between the upper surface of a nail member 32c projecting rearward along the lower surface of the operation plate member 30 and the lower surface of the operation plate member 30 (see also FIG. 7A). In this manner, each of the engaging parts 32a and 32b serves as a hinge that supports a rear end of the push button 24 while allowing rotation (vertical movement) of the push button 24.

The elastic part 34 is disposed between each pair of the engaging parts 32a and 32b. The elastic part 34 hangs down from the lower surface of the operation plate member 30 and then projects rearward to a distance larger than the engaging parts 32a and 32b along the lower surface of the operation plate member 30. A portion of the elastic part 34 projecting rearward along the lower surface of the operation plate member 30 serves as a plate spring member 34a that can be elastically deformed in the vertical direction. A proximal end of the elastic part 34 is disposed on the lower surface of the operation plate member 30 at a location forward of the proximal ends of the engaging parts 32a and 32b, and the distal end of the plate spring member 34a is substantially flush with the distal ends of the engaging parts 32a and 32b. The elastic part 34 pinches a supporting shaft (tension shaft) 38 (see FIG. 3) disposed on the base member 22 between the upper surface of the plate spring member 34a and the lower surface of the operation plate member 30 (see also FIG. 7B).

The stopper members 35 are separated from each other in the lateral direction on a front end portion of the lower surface of the operation plate member 30. Each of the stopper members 35 is a hook member hanging down from the lower surface of the operation plate member 30 and projecting rearward along the lower surface of the operation plate member 30. Each of the stopper members 35 is locked with a locking member 39 (see FIG. 3) provided on the base member 22, restricts the limit of upward movement of the push button 24, and serves as a stopper against upward accidental detachment of the push button 24.

As illustrated in FIGS. 4A-4B, a pressing projection 40 is provided substantially at the middle of the rear end of the lower surface of the operation plate member 30. The pressing projection 40 presses a contact point of a detection switch 41 (see FIG. 3) constituted by a metal dome switch and disposed on the base member 22, and used for detecting a pressing operation of the push button 24. The detection switch 41 is disposed in a hole 42 formed in the housing plate 22b. The detection switch 41 may be constituted by a contact point of a membrane sheet.

The configurations of the right push button 26 and the left push button 24 are symmetric in the lateral direction and are substantially the same. Thus, the push button 26 will not be described in detail here.

In the present embodiment, the center push button 25 is different from the push buttons 24 and 26 in shape and size. The front end of the push button 25 is rotatably engaged with a pair of left and right engaging hooks 44 disposed at the front end of the base member 22. The rear end of the push button 25 is locked with a pair of left and right locking members 45 disposed at the rear end of the base member 22 in such a manner that the push button 25 can move vertically. In this manner, the push button 25 can rotate (move vertically) using the front end thereof as a rotation center by a pressing operation. The pressing operation of the push button 25 is detected by the detection switch 41 such as a metal dome switch disposed in the hole 42 of the housing plate 22b. The push button 25 may have a configuration similar to that of the push buttons 24 and 26.

Figure 6:
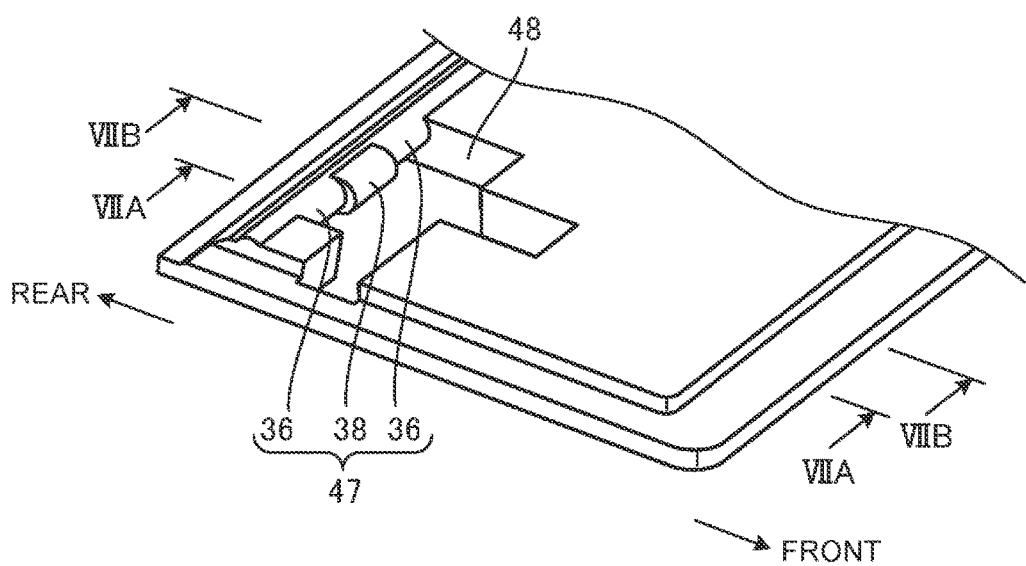
FIG. 6 is an enlarged view illustrating a rotational shaft and a supporting shaft of a base member and their peripheries.

FIG. 6 illustrates the rotational shaft 36 and the supporting shaft 38 of the base member 22 and their peripheries.

As shown in FIGS. 3 and 6, four pairs of bearing parts 47 are arranged in the lateral direction at the rear end of the housing plate 22b of the base member 22. The two pairs of bearing parts 47 arranged in the lateral direction on a left portion of the housing plate 22b serve as an attachment part for the left push button 24. The two pairs of bearing parts 47 arranged in the lateral direction on a right portion of the housing plate 22b serve as an attachment part for the right push button 26. Each of the bearing parts 47 includes a pair of left and right rotational shafts 36 and 36 and the supporting shaft 38.

Each of the pair of rotational shafts 36 and 36 has a semi-cylindrical shape facing forward on the rear inner wall surface of the hole 48 formed at the rear end of the housing plate 22b. The rotational shafts 36 are disposed coaxially. The engaging parts 32a and 32b of the push buttons 24 and 26 are rotatably engaged with the rotational shafts 36.

The supporting shaft 38 is disposed between the pair of rotational shafts 36 and 36. The supporting shaft 38 has a semi-elliptic cylindrical shape facing forward on the rear inner wall of the hole 48. The supporting shaft 38 is disposed in such a manner that the outer peripheral surface of the supporting shaft 38 is offset forward from the rotational shaft 36 in the direction orthogonal to the lateral direction, which is the axial direction of the rotational shaft 36. In other words, the focal point or the center axis of the supporting shaft 38 is shifted forward from the center axis of the rotational shaft 36. The elastic parts 34 of the push buttons 24 and 26 are pressed against the supporting shafts 38. The supporting shaft 38 may be coaxial with the rotational shaft 36 or may be coaxial and have the same radius as the rotational shaft 36.

Next, an engagement configuration between the engaging shaft members 31 of the push buttons 24 and 26 and the bearing parts 47 of the base member 22 and an operation when the push buttons 24 and 26 are pressed will be described.

Figure 7A:
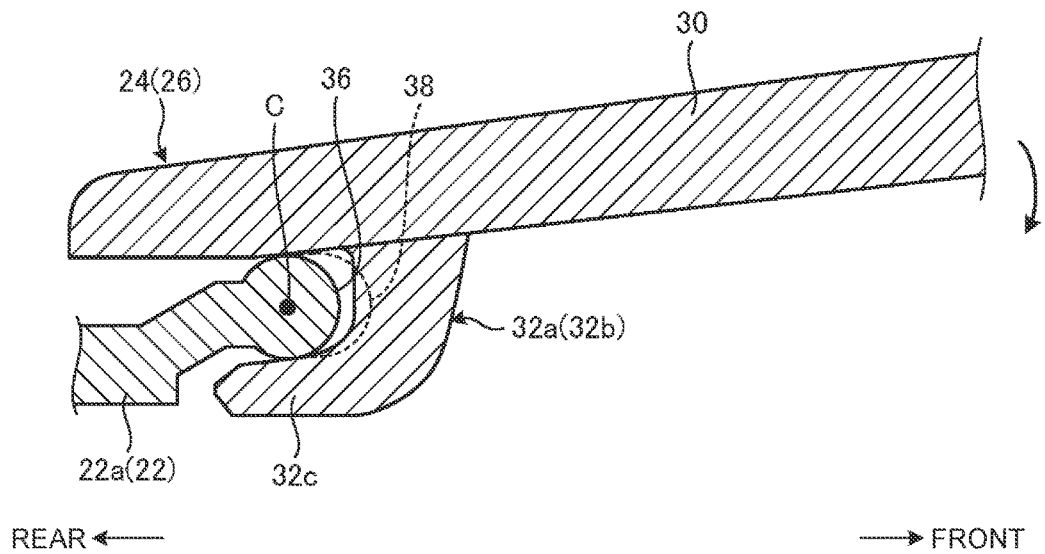
FIG. 7A is a cross-sectional view taken along line VIIA-VIIA in FIG. 6 in a state where the push button is attached to the base member.
Figure 7B:
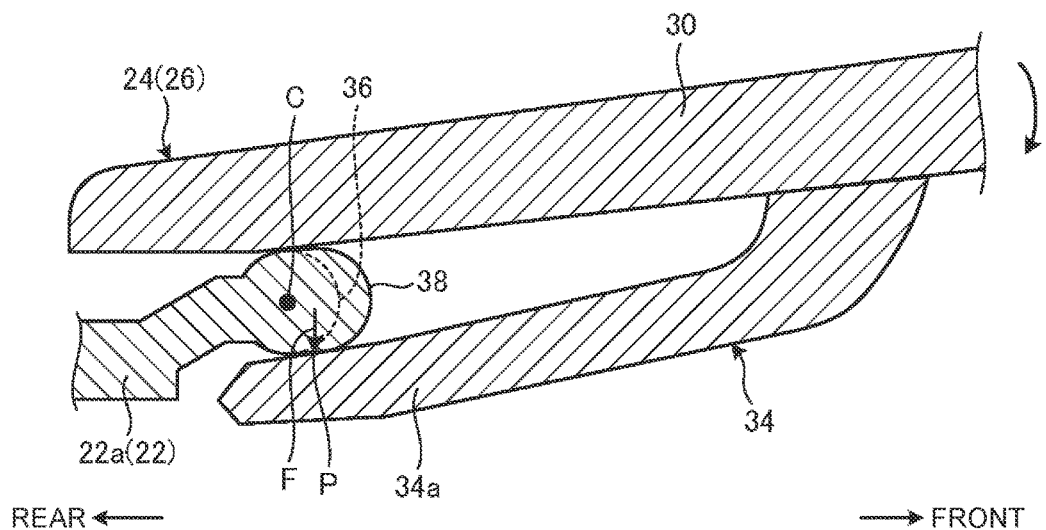
FIG. 7B is a cross-sectional view taken along line VIIB-VIIB in FIG. 6 in the state where the push button is attached to the base member.

FIG. 7A is a cross-sectional view taken along line VIIA-VIIA in FIG. 6 in a state where the push button 24 (26) is attached to the base member 22, and is a view of an engaged portion between the engaging part 32a (32b) and the rotational shaft 36 taken along the front-and-rear direction. FIG. 7B is a cross-sectional view taken along line VIIB-VIIB in FIG. 6 in the state where the push button 24 (26) is attached to the base member 22, and is a view of a contact portion between the elastic part 34 and the supporting shaft 38 taken along the front-and-rear direction.

As shown in FIG. 7A, the engaging part 32a (32b) is rotatably engaged with the rotational shaft 36. Specifically, the engaging part 32a (32b) is engaged with the rotational shaft 36 between the upper surface of the nail member 32c and the lower surface of the operation plate member 30. The engaged portion between the engaging part 32a (32b) and the rotational shaft 36 serves as a rotational shaft of the push button 24 (26).

As shown in FIG. 7B, the elastic part 34 is pushed against the supporting shaft 38. Specifically, the elastic part 34 pinches the supporting shaft 38 between the upper surface of the plate spring member 34a and the lower surface of the operation plate member 30. In this manner, the upper surface of the plate spring member 34a biases the outer peripheral surface of the supporting shaft 38 upward. The supporting shaft 38 is disposed at a location offset forward from the rotational shaft 36. Thus, a pressing position P at which the plate spring member 34a of the elastic part 34 presses the supporting shaft 38 is located forward of an axial center C of the rotational shaft 36.

Thus, a front end portion of the push button 24 (26) rotates about the engaged portion between the engaging parts 32a and 32b and the rotational shaft 36 at the rear end when the operation plate member 30 is pressed. Consequently, the pressing projection 40 presses the detection switch 41 so that the pressing operation on the push button 24 (26) is detected. At this time, the elastic part 34 is in a state in which the upper surface of the plate spring member 34a is elastically pressed against the supporting shaft 38, and does not hinder the rotation operation of the push button 24 (26).

The engaging parts 32a and 32b need to be engaged with the rotational shaft 36 with a smooth rotation operation of the push button 24 (26) being obtained. That is, the engagement is performed with a small gap (backlash) based on dimensional tolerance to some degree being left between the upper surface of the engaging part 32a (32b) and the lower surface of the operation plate member 30 and the outer peripheral surface of the rotational shaft 36. Consequently, only with the engagement structure of the engaging parts 32a and 32b with the rotational shaft 36, backlash might occur in the front-and-rear, lateral, or vertical direction irrespective of whether the push button 24 (26) is in use or not.

In view of this, the switching device 10 includes the elastic part 34 that is elastically pressed against the supporting shaft 38 in order to enable absorption of backlash between the engaging parts 32a and 32b and the rotational shaft 36. As a result, the switching device 10 can prevent occurrence of backlash of the push button 24 (26) in the front-and-rear, lateral, or vertical direction irrespective of whether the push button 24 (26) is in use or not, and thereby, the product quality can be enhanced. In addition, the switching device 10 can provide a margin in dimensional tolerance regarding the engaged portion between the engaging parts 32a and 32b and the rotational shaft 36. Thus, the switching device 10 does not require special skills in, for example, manufacturing dies or the like, and the push button 24 (26) can be easily assembled to the base member 22 so that manufacturing efficiency can be enhanced.

In the switching device 10, the detection switch 41 is constituted by a metal dome switch. That is, the metal dome switch is harder and has higher rigidity than a typical rubber dome or the like. Thus, unless the backlash described above is kept between the engaging parts 32a and 32b and the rotational shaft 36, the detection switch 41 might hinder smooth attachment of the push button 24 (26) to the base member 22. In this regard, since the switching device 10 includes the elastic part 34 and the supporting shaft 38, an appropriate degree of backlash can be kept between the engaging parts 32a and 32b and the rotational shaft 36. As a result, even with the use of a metal dome switch for the detection switch 41, a decrease in manufacturing efficiency can be avoided.

In the switching device 10, the supporting shaft 38 is offset from the rotational shaft 36 in the direction orthogonal to the axial direction of the rotational shaft 36. In the present embodiment, the engaging parts 32a and 32b and the rotational shaft 36 are engaged with each other at the rear end as one end of the push button 24 (26), and the supporting shaft 38 is offset from the rotational shaft 36 toward the front end as the other end of the push button 24 (26). This under a repulsive force F (see FIG. 7B) in the opposite direction to the biasing force from the supporting shaft 38, the elastic part 34 receives a moment of a force with which the push button 24 (26) rotates clockwise in FIG. 7B. Consequently, the push button 24 (26) is always set in a position in which the front end opposite to the engaging parts 32a and 32b is slightly rotated downward in the pressing direction. This further ensures absorption of backlash of the push button 24 (26) in the vertical direction.

The supporting shaft 38 may be offset rearward from the rotational shaft 36. In this case, the lower surface of the plate spring member 34a of the elastic part 34 is biased from above toward the supporting shaft 38, for example. In this manner, the push button 24 (26) can be always set in a position in which the front end of the push button 24 (26) is slightly rotated downward in the pressing direction.

In the switching device 10, a pair of rotational shafts 36 is arranged in the axial direction, and the supporting shaft 38 is disposed between the pair of rotational shafts 36 and 36. That is, suppose the engaging parts 32a and 32b and their corresponding rotational shafts 36 are omitted between a pair of engaging shaft members 31 and the bearing parts 47. In this case, one engaging part 32a, the rotational shaft 36, the elastic part 34, and the supporting shaft 38 are arranged in the lateral direction. At this time, since the elastic part 34 has a lower rigidity than the engaging part 32a, of course, the lateral balance decreases, and under some operating conditions, the elastic part 34 might be accidentally detached from the supporting shaft 38 so that the push button 24 (26) is accidentally detached. In this regard, occurrence of such a problem can be prevented with a configuration in which a pair of rotational shafts 36 is provided side by side in the axial direction to sandwich the supporting shaft 38 therebetween. The engaging part 32b and the rotational shaft 36 constituting one of the pair may be, of course, omitted depending on the shape and the rigidity of the engaging part 32a and specifications or the like of the switching device 10.

In this switching device 10, the push button 24 (26) includes the engaging parts 32a and 32b and the elastic part 34, and the base member 22 includes the rotational shaft 36 and the supporting shaft 38. The rotational shaft 36 is engaged between the engaging parts 32a and 32b and the push button 24 (26), and the supporting shaft 38 is pinched between the elastic part 34 and the lower surface of the push button 24 (26). This, the rotation mechanism of the push button 24 (26) can be simplified, and the thickness of the entire device can be reduced.

Figure 8:
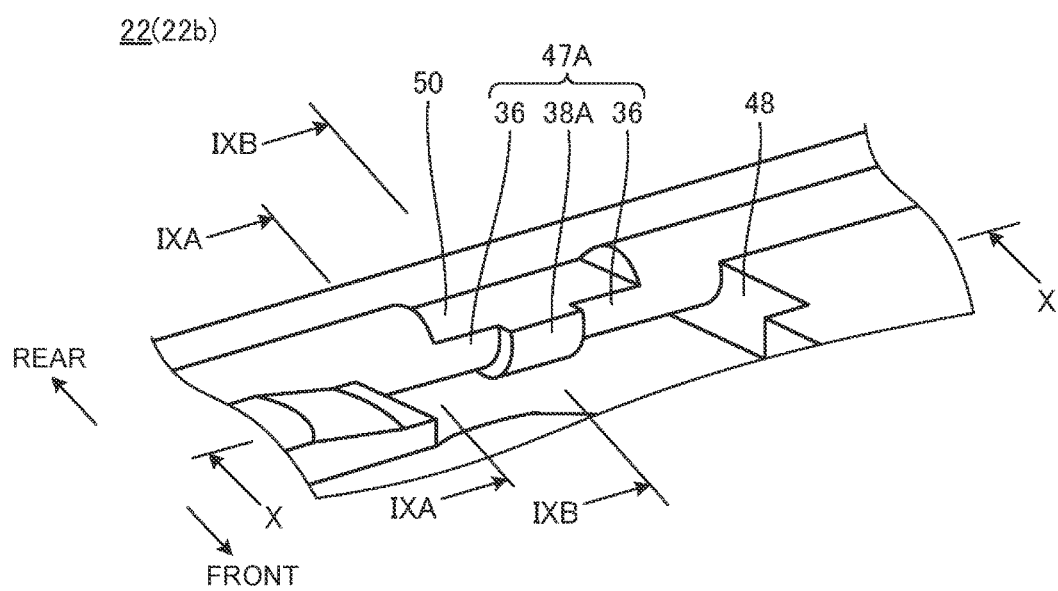
FIG. 8 is an enlarged view illustrating a bearing part and a periphery thereof according to an alternative embodiment.

FIG. 8 illustrates a bearing part 47A and a periphery thereof according to a variation. As shown in FIG. 8, the bearing part 47A is different from the bearing part 47 illustrated in FIG. 6 in that a recess 50 is formed in the upper surface of the bearing parts 47A. The bearing parts 47A includes a supporting shaft 38A whose upper surface is recessed because of the recess 50, as compared to the supporting shaft 38 described above.

Figure 9A:
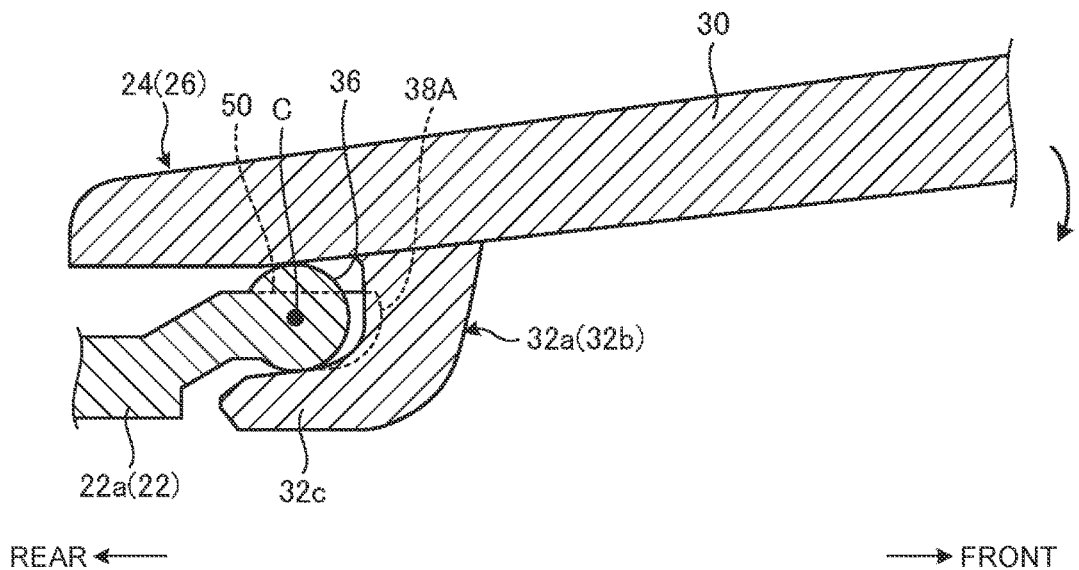
FIG. 9A is a cross-sectional view taken along line IXA-IXA in FIG. 8 in the state where the push button is attached to the base member.
Figure 9B:
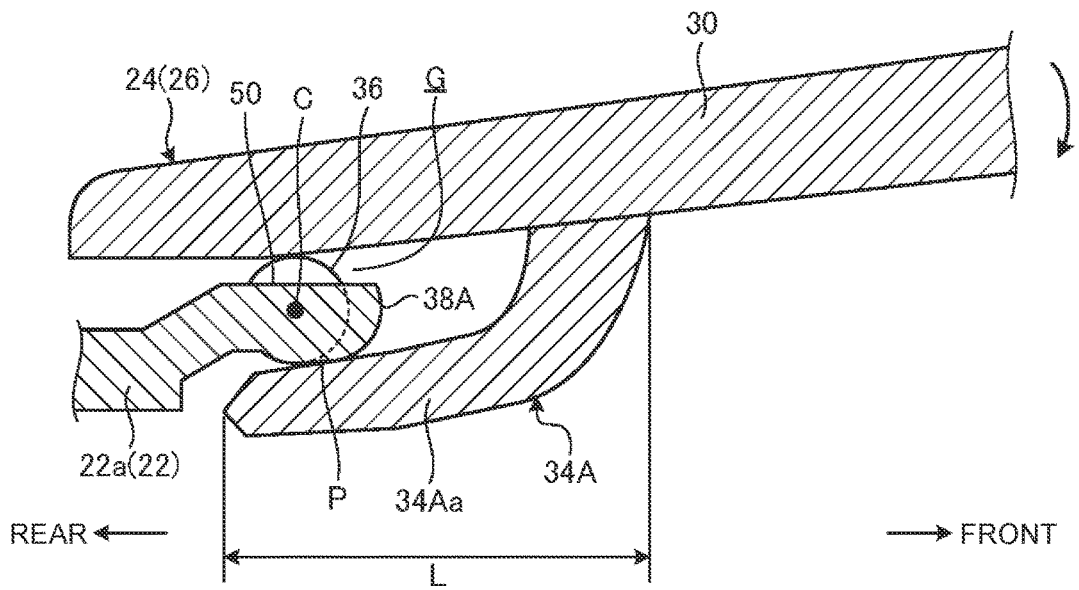
FIG. 9B is a cross-sectional view taken along line IXB-IXB in FIG. 8 in the state where the push button is attached to the base member.
Figure 10:
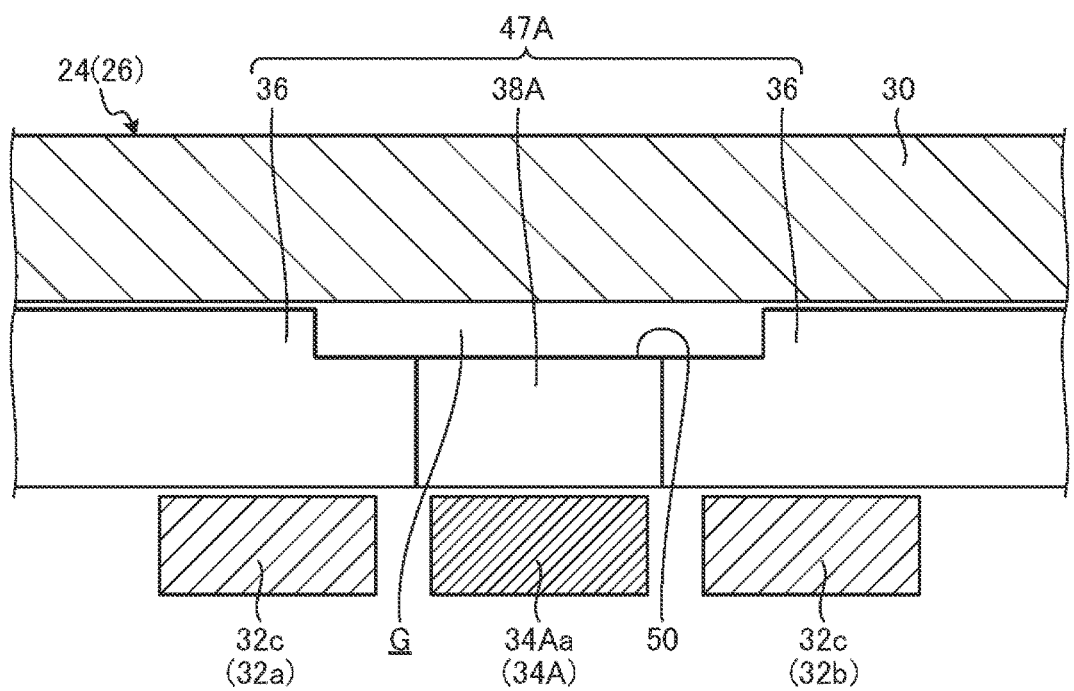
FIG. 10 is a cross-sectional view taken along line X-X in FIG. 8 in the state where the push button is attached to the base member.

FIG. 9A is a cross-sectional view taken along line IXA-IXA in FIG. 8 in a state where the push button 24 (26) is attached to the base member 22 through the bearing part 47A, and is a view of an engaged portion between the engaging part 32a (32b) and the rotational shaft 36 taken along the front-and-rear direction. FIG. 9B is a cross-sectional view taken along line IXB-IXB in FIG. 8 in the state where the push button 24 (26) is attached to the base member 22 through the bearing part 47A, and is a view of a contact portion between the elastic part 34A and the supporting shaft 38A taken along the front-and-rear direction. FIG. 10 is a cross-sectional view taken along line X-X in FIG. 8 in the state where the push button 24 (26) is attached to the base member 22 through the bearing part 47A. In FIG. 10, for viewability of the drawing, a slight gap is shown between the operation plate member 30, the engaging parts 32a and 32b, and elastic part 34A, and the bearing part 47A, but in actual operation, the operation plate member 30 and other members and the bearing part 47A contact each other except for a as gap G.

As illustrated in FIGS. 8 and 9A, each rotational shaft 36 of the bearing part 47A has a configuration similar to the rotational shaft 36 of the bearing part 47 illustrated in FIG. 6. The engaging part 32a (32b) is engaged with the rotational shaft 36 between the upper surface of the nail member 32c and the lower surface of the operation plate member 30. At this time, since each the rotational shaft 36 partially includes the recess 50, the gap G occurs between the rotational shaft 36 and the lower surface of the operation plate member 30. Most part of the remaining part of the rotational shaft 36, however, contacts the lower surface of the operation plate member 30, and thus, the function of the push button 24 (26) as a rotational shaft is not impaired.

As illustrated in FIG. 9B, the supporting shaft 38A is configured to be semi-elliptic cylindrical shape facing forward on the rear inner wall surface of the hole 48, and the upper surface of the supporting shalt 38A is partially cut out by the recess 50. Accordingly, with the elastic part 34A of the push button 24 (26) being pressed against the supporting shaft 38A, a gap G formed by the recess 50 is provided between the upper surface of the supporting shaft 38A and the lower surface of the operation plate member 30 (see FIGS. 9B and 10). The presence of the gap G between the supporting shaft 38A and the lower surface of the operation plate member 30 enables the supporting shaft 38A to have a flexible structure that can be elastically deformed in the vertical direction. In addition, the small-diameter shape by the recess 50 enables the supporting shaft 38A to be elastically deformed more smoothly. In a manner similar to the supporting shaft 38 illustrated in FIG. 7B, the focal point or the center axis of the supporting shaft 38A is shifted forward from the center axis of the rotational shaft 36.

As shown in FIGS. 9B and 10, the elastic part 34A that is pressed against the supporting shaft 38A has a projection length L shorter than the elastic part 34 illustrated in FIG. 7B. The projection length L is the front-and-rear direction of the plate spring member 34Aa. In the elastic part 34A, when the upper surface of the plate spring member 34Aa is pressed against the lower surface of the supporting shaft 38A, the upper surface of the plate spring member 34Aa is biased upward along the outer peripheral surface of the supporting shaft 38A.

In the elastic part 34A, the projection length L of the plate spring member 34Aa is smaller than that of the plate spring member 34a of the elastic part 34. Thus, in the elastic part 34A, the plate spring member 34Aa has an elastic deformation larger than that of the plate spring member 34a of the elastic part 34 and has an elastic deformation amount smaller than that of the plate spring member 34a of the elastic part 34. In view of this, in the bearing part 47A, the supporting shaft 38A has an elastic structure using the recess 50. As a result, the bearing part 47A can compensate for small elastic deformation of the elastic part 34A by elastic deformation of the supporting shaft 38A.

As described above, even in the case of using the elastic part 34A having a small projection length L and a small elastic deformation amount, since the switching device 10 includes the supporting shaft 38A that can be elastically deformed, backlash between the engaging parts 32a and 32b and the rotational shaft 36 can be absorbed. As a result, in the switching device 10, occurrence of backlash of the push button 24 (26) in the front-and-rear, lateral, or vertical direction irrespective of whether the push button 24 (26) is in use or not can be prevented so that the product quality can be enhanced. In other words, since the switching device 10 includes the elastic supporting shaft 38A, the projection length L of the elastic part 34A can be made small. In this manner, manufacturing efficiency of the push button 24 (26) can be enhanced, and the push button 24 (26) can be more easily assembled to the bearing parts 47A of the push button 24 (26). Of course, the supporting shaft 38A may be used for the elastic part 34 illustrated in FIG. 7B.

Although the foregoing description is directed to the example configuration in which the switching device 10 is integrally provided to the keyboard device 16, the switching device 10 and the keyboard device 16 may be configured as separate members. The switching device 10 may be configured integrally with the touch pad device 20. The switching device 10 may be mounted on an electronic device independently of the keyboard device 16 and the touch pad device 20.

The foregoing description is directed to the example configuration in which the push button 24 (26) includes the engaging parts 32a and 32b and the elastic part 34 (34A) and the base member 22 includes the rotational shaft 36 and the supporting shaft 38 (38A). Alternatively, a configuration in which the base member 22 includes the engaging parts 32a and 32b and the elastic part 34 (34A) and the push button 24 (26) includes the rotational shaft 36 and the supporting shaft 38 (38A) may be employed. A configuration in which the push button 24 (26) includes the engaging parts 32a and 32b and the supporting shaft 38 (38A) and the base member 22 includes the elastic part 34 (34A) and the rotational shaft 36 may also be employed.

As has been described, the present invention provides an improved switching device for electronic devices.

While the invention has been particularly shown and described with reference to a preferred embodiment, it will be understood by those skilled in the art that various changes in form and detail may be made therein without departing from the spirit and scope of the invention.

What is claimed is:

1. A switching device comprising:
a base member having a first and second rotational shafts and a supporting shaft;
a push button rotatably supported on an upper surface of said base member, wherein said push button includes a first and second engaging parts and an elastic part, wherein said first and second engaging parts are rotatably engaged with said first and second rotational shafts, respectively, and said elastic part is pressed against said supporting shaft; and
a detection switch to be pressed in response to said push button being pressed to rotate, wherein said push button rotates about an engaged portion between said first and second engaging parts and said first and second rotational shafts, respectively, with said elastic part being pressed against said supporting shaft, and, in turn, presses said detection switch.

2. The switching device of claim 1, wherein said supporting shaft is offset from said first and second rotational shafts in a direction orthogonal to an axial direction of said first and second rotational shafts.

3. The switching device of claim 1, wherein said first and second engaging parts and said first and second rotational shafts are respectively engaged with each other near an edge of said push button.

4. The switching device of claim 1, wherein said supporting shaft is offset from said first and second rotational shafts.

5. The switching device of claim 1, wherein said first and second rotational shafts are arranged in an axial direction, and said supporting shaft is disposed between said first and second of rotational shafts.

6. The switching device of claim 1, wherein
said first and second rotational shafts are respectively engaged between said first and second engaging parts and a lower surface of said push button, and
said supporting shaft is pinched between said elastic part and said lower surface of said push button.

7. The switching device of claim 6, wherein a gap is provided between said supporting shaft and said lower surface of said push button.

8. The switching device of claim 1, wherein said supporting shaft has a flexible structure elastically deformable at least in a direction in which said elastic part is pressed.

9. An electronic device comprising:
a display device contained within a display chassis;
a keyboard contained within a body chassis rotatably connected to said display chassis; and
a switching device connected to said keyboard, wherein said switching device includes
a base member having a first and second rotational shafts and a supporting shaft;
a push button rotatably supported on an upper surface of said base member, wherein said push button includes a first and second engaging parts and an elastic part, wherein said first and second engaging parts are rotatably engaged with said first and second rotational shafts, respectively, and said elastic part is pressed against said supporting shaft; and
a detection switch to be pressed in response to said push button being pressed to rotate, wherein said push button rotates about an engaged portion between said first and second engaging parts and said first and second rotational shafts, respectively, with said elastic part being pressed against said supporting shaft, and, in turn, presses said detection switch.

10. The electronic device of claim 9, wherein said supporting shaft is offset from said first and second rotational shafts in a direction orthogonal to an axial direction of said first and second rotational shafts.

11. The electronic device of claim 9, wherein said first and second engaging parts and said first and second rotational shafts are respectively engaged with each other at an end of said push button.

12. The electronic device of claim 9, wherein said supporting shaft is offset from said first and second rotational shafts.

13. The electronic device of claim 9, wherein said first and second rotational shafts are arranged in an axial direction, and said supporting shaft is disposed between said first and second of rotational shafts.

14. The electronic device of claim 9, wherein
said first and second rotational shafts are respectively engaged between said first and second engaging parts and a lower surface of said push button, and
said supporting shaft is pinched between said elastic part and said lower surface of said push button.

15. The electronic device of claim 14, wherein a gap is provided between said supporting shaft and said lower surface of said push button.

16. The electronic device of claim 9, wherein said supporting shaft has a flexible structure elastically deformable at least in a direction in which said elastic part is pressed.

* * * * *